United States Patent
Schrey et al.

(10) Patent No.: US 8,235,365 B2
(45) Date of Patent: Aug. 7, 2012

(54) NATURAL DRAFT AIR COOLED STEAM CONDENSER AND METHOD

(75) Inventors: Hans Georg Schrey, Ratingen (DE); Richard Leitz, Hilden (DE); Michel Vouche, Brussels (BE); Philippe Nagel, Wemmel (BE)

(73) Assignee: SPX Cooling Technologies, Inc., Overland Park, KS (US)

( * ) Notice: Subject to any disclaimer, the term of this patent is extended or adjusted under 35 U.S.C. 154(b) by 498 days.

(21) Appl. No.: 12/466,885

(22) Filed: May 15, 2009

(65) Prior Publication Data

US 2010/0288473 A1   Nov. 18, 2010

(51) Int. Cl.
*B01F 3/04* (2006.01)

(52) U.S. Cl. .................. 261/127; 261/157; 261/DIG. 11

(58) Field of Classification Search .................. 261/127, 261/128, 156, 157, 160, DIG. 10, DIG. 11; 165/913
See application file for complete search history.

(56) References Cited

U.S. PATENT DOCUMENTS

| | | | | |
|---|---|---|---|---|
| 3,727,679 A | * | 4/1973 | Von Cleve | 165/111 |
| 3,776,306 A | * | 12/1973 | Michel | 165/111 |
| 3,800,861 A | * | 4/1974 | Flitner et al. | 165/111 |
| 3,851,702 A | * | 12/1974 | Heller et al. | 165/110 |
| 3,887,666 A | * | 6/1975 | Heller et al. | 261/130 |
| 3,915,223 A | * | 10/1975 | Kelp | 165/111 |
| 3,923,935 A | * | 12/1975 | Cates | 261/159 |
| 3,942,588 A | * | 3/1976 | Schoonman | 165/129 |
| 4,299,785 A | * | 11/1981 | Fougea | 261/111 |
| 4,397,793 A | | 8/1983 | Stillman | |
| 4,446,914 A | * | 5/1984 | Russell | 165/129 |
| 4,903,491 A | * | 2/1990 | Larinoff | 60/692 |
| 4,905,474 A | * | 3/1990 | Larinoff | 60/692 |
| 5,902,522 A | | 5/1999 | Seawell | |
| 6,233,941 B1 | * | 5/2001 | Youssef | 60/670 |
| 7,431,270 B2 | | 10/2008 | Mockry | |

* cited by examiner

*Primary Examiner* — Charles Bushey
(74) *Attorney, Agent, or Firm* — Baker & Hostetler LLP

(57) ABSTRACT

An air cooled condenser apparatus has a tubular shell having an open upper end and an open lower end, a ring of tube bundle panels disposed generally vertically and at an angle to each other, with each of the tube bundles having a primary condenser region and a secondary condenser region, and adapted for air flow therethrough to condense fluid in the panels, and configured so that air flow through the panels passes through and exits the open upper end of the shell, and a duct disposed at the ground level of the shell, and a non-condensable extraction system with active or passive devices to control the local rate of the evacuated mixture of non-condensables and attached steam.

16 Claims, 1 Drawing Sheet

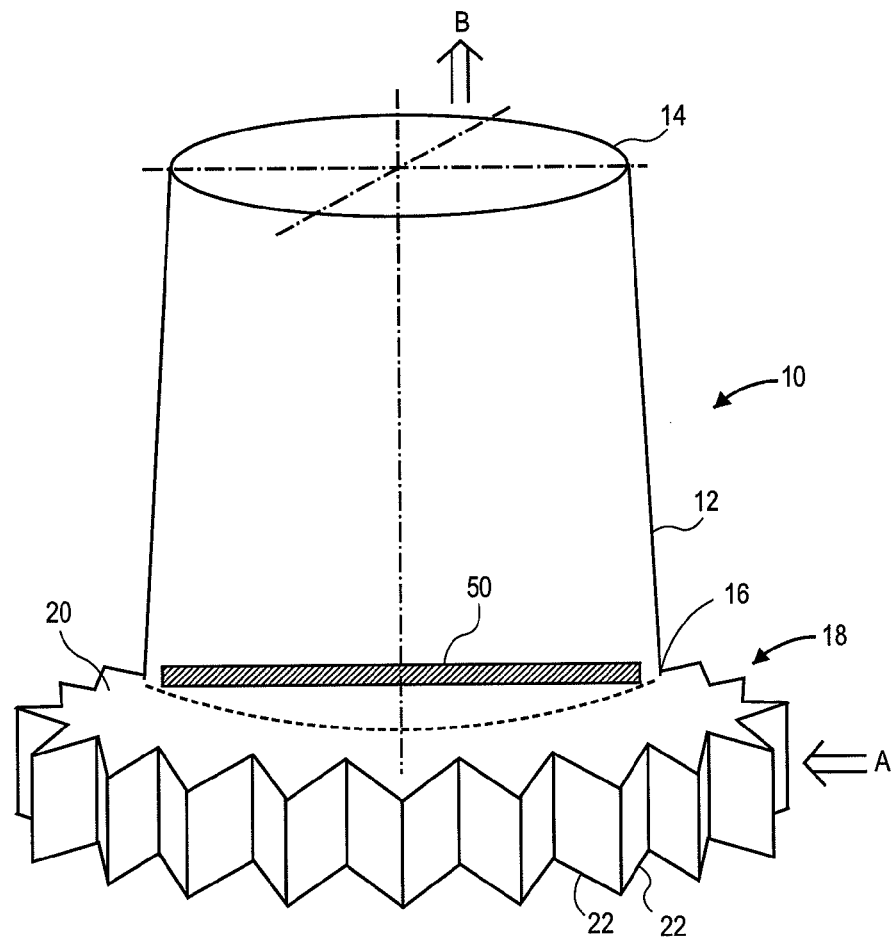
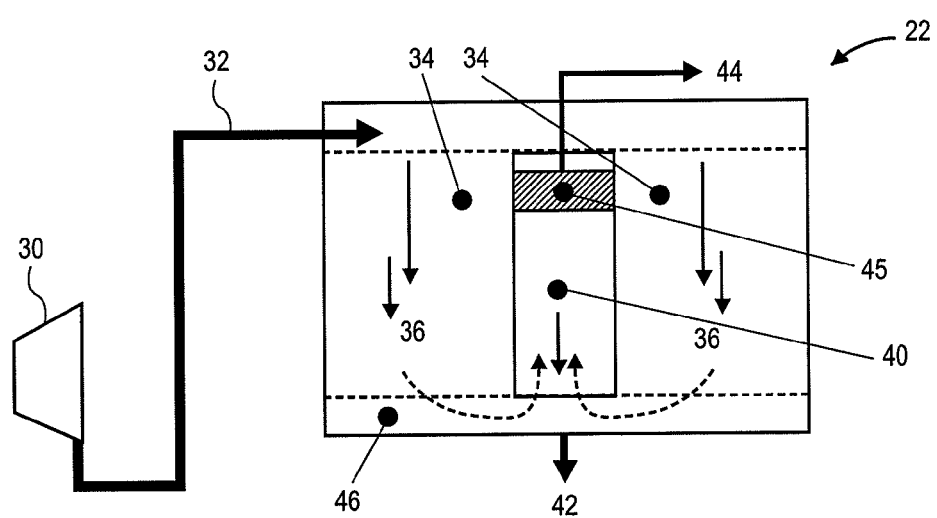

NATURAL DRAFT AIR COOLED STEAM CONDENSER AND METHOD

FIELD OF THE INVENTION

The invention relates generally to the field of vacuum steam air cooled condensers for Power Plant, and more particularly relates to natural draft air cooled condensers.

BACKGROUND OF THE INVENTION

Many types of industrial facilities, such as for example, steam power plants, require condensation of the steam as integral part of the closed steam cycle. Both wet and dry type cooling towers have been used for condensing purposes. As wet cooled systems consume a considerable amount of cooling water dry cooling systems have gained a growing market share because of their ability to save water resources. In particular, forced draught dry air-cooled condensers consisting of a multitude of fin tube heat exchangers have been known for many years. Contrary to wet cooling arrangements which are characterized by a secondary cooling water loop these systems are so-called "direct" dry systems where steam is directly condensed in the fin tube heat exchangers by air cooling. The fin tube heat exchangers are mounted with the tube center lines arranged in a position inclined to the vertical direction. The bundles are mounted to a support structure which enables cooling air to be conveyed through the fin tube heat exchangers by means of fans. Ambient air in contact with the fin tube heat exchangers condenses the steam inside the fin tubes, which then exits the heat exchanger as condensed sub-cooled liquid. Although being commercially successful over many years a disadvantage of direct dry air-cooled condensers is the power required to operate the fans, as well as fan noise which is undesirable in most situations. Currently 2 types of dry cooling are used, ACC fan assisted, and IDCT natural draft or fan assisted.

Another type of system is the so-called "indirect" dry cooling system. In such a system, a turbine exhaust condenser is provided, where turbine steam is condensed by means of cooling water. The cooling water is conveyed through a water duct by means of a pump to an air-cooled cooling tower which may be of wet or dry type. In the case of dry type the cooling tower consists of a multitude of air-cooled heat exchangers where the heat is rejected to the ambient air by convection. The cooling tower may be operated with fan assistance or in natural draught. The turbine exhaust condenser may for example be a surface or a jet condenser. Because of the presence of a secondary water loop, indirect dry cooling systems are not as thermally effective as direct dry systems. Another disadvantage of natural draught indirect dry cooling systems, however, is the higher investment cost as compared to the forced draught direct air cooled condenser.

Vacuum steam condensers are characterized by ingress of ambient air (inert gas or non-condensables). If not completely withdrawn from the heat exchangers this air will reduce the exchanger efficiency considerably because non-condensables will accumulate and create "air pockets" within the finned tubes. Consequently, effective heat exchange surface and condenser performance will be reduced. Therefore, vacuum condensers are provided with a secondary condenser arranged in reflux mode where the inert gases are extracted from the top exchanger headers of the secondary condenser bundles by special evacuation means. To safeguard that all inert gases are conveyed to these secondary condenser top headers the secondary condenser tube bundles must always be properly supplied by cooling air. Due to local fluctuations of ambient air caused by wind or other reasons natural draught cooled systems may in some instances not be able to maintain permanent secondary condenser cooling while some primary condenser sections are still cooled. This may not only lead to accumulation of inert gases and performance reduction, but also to increase of tube side corrosion as well as the danger of tube side freezing under frost conditions. As long as proper evacuation of the heat exchanger bundles is not guaranteed under all operating conditions the combination of dry condensation and natural draught cooling—although being discussed for some time—poses non-accountable risks to the operator of such equipment.

From the foregoing, although the present direct and indirect systems have proven advantageous, there is a need in the art for other air cooled steam condenser types which can in some cases reduce noise, cost, and/or energy consumption and, at the same time, keep the operational safety as before.

SUMMARY OF THE INVENTION

Some embodiments of the invention provide air cooled steam condensers which can in some cases reduce noise, cost, and/or energy consumption. In some embodiments, to counter air accumulation in the heat exchangers, primary and secondary condenser sections are combined in one heat exchanger bundle. Thus, local fluctuations of cooling air flow always affect primary and secondary section at the same time—so that full evacuation of air is maintained locally.

One of the embodiments of the present invention is an air cooled condenser apparatus with a hyperbolic or cylindrical shell having an open upper end and an open lower end, a ring of heat exchanger bundle pairs disposed generally vertically with the bundles in each pair at an angle to each other and disposed at the lower end of the shell, with each of the heat exchanger bundles comprising a primary condenser region and a secondary condenser region, and adapted for air flow therethrough to condense steam in the bundles and configured so that air flow through the bundles passes through and exits the open upper end of the shell, and a steam duct located at the bottom of the shell and an air evacuation system connected to the secondary condenser top headers. Each side of a pair may contain more than one heat exchanger bundle depending on total heat rejection requirement and shell size.

Another embodiment details an air cooled condenser apparatus with a ring of heat exchanger bundle pairs disposed generally vertically with the bundles in each pair at an angle to each other and disposed at the lower end of the shell, with each of the heat exchanger bundles comprising a primary condensing section and a secondary condensing section, and adapted for air flow therethrough to condense steam in the bundles, and air flow controlling means configured so that air flow through the bundles, which in some examples is especially suited for applications in frost conditions.

In another embodiment, an air cooled condensing method also includes providing a hyperbolic or cylindrical shell having an open upper end and an open lower end, providing more than one ring of heat exchanger bundles disposed generally vertically and at an angle to each other, with each of the bundles comprising a primary condenser region and a secondary condenser region, and adapted for air flow therethrough to condense steam in the bundles and configured so that air flow through the bundles passes through and exits the open upper end of the shell, providing a steam duct disposed at the bottom of the shell, with the duct supplying steam to the bundles. The rings of pairs of heat exchanger bundles are arranged on top of each other. Evacuation lines are supplied to withdraw accumulated air from the heat exchangers. The sides of the heat exchanger pairs may consist of more than one bundle and the air flow may be controlled by air flow controlling means.

Another embodiment of the present invention provides an air cooled condenser apparatus, which has a tubular shell having an open upper end and an open lower end to create a natural draught for cooling air flow, a ring of cooling panel pairs disposed generally vertically with the panels in each pair at an angle to each other and disposed at the lower end of the shell, with each of the panels comprising single row tube bundles with a primary condenser region and a secondary condenser region, and adapted for air flow therethrough to condense steam in the panels, a duct disposed on the ground level of the shell to supply steam to the tube bundles, air flow controlling devices to adapt to different operating conditions and a non-condensable extraction system that controls the local rate of the evacuated mixture of non-condensables and attached steam.

An embodiment of the present invention is an air cooled condenser apparatus, with a ring of cooling panel pairs disposed generally vertically with the panels in each pair at an angle to each other and disposed at the lower end of the shell, with each of the panels comprising a primary condensing means and a secondary condensing means, and adapted for air flow therethrough to condense fluid in the panels, tube bundles with more than one tube row where each row is related to either the primary or the secondary condenser section with the secondary section facing the cooling air, air directing means configured so that air flow through the panels, and a non-condensable extraction system with active or passive devices to control the local rate of the evacuated mixture of non-condensables and attached steam.

Yet a further embodiment provides an air cooled condensing method which provides a tubular shell having an open upper end and an open lower end to create a natural draught for cooling air flow, a ring of cooling panels disposed generally vertically and at an angle to each other, with each of the tube bundles comprising a primary condenser region and a secondary condenser region, and adapted for air flow therethrough to condense fluid in the panels, a duct disposed at the ground level of the shell. The duct supplies steam to the panels and controls the air flow rate.

Another embodiment provides an air cooled condenser apparatus, having a tubular shell having an open upper end and an open lower end, a ring of hybrid cooling panels disposed generally vertically in delta pairs next to each other, with each of the hybrid panels comprising a primary condenser region and a secondary condenser region, and adapted for air flow therethrough to condense fluid in the panels, wherein the ring is disposed at the lower end of the shell and configured so that air flow through the panels passes through and exits the open upper end of the shell, and a wet cooling system disposed at an interior of the shell.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 1 is a schematic perspective view of a cooling tower having a shell and peripheral heat exchanger bundles according to a preferred embodiment of the present invention.

FIG. 2 is a schematic diagram of the flow through an individual heat exchanger bundle.

DETAILED DESCRIPTION

Some of the embodiments of the invention provide air cooled steam condensers which can in some cases reduce noise, cost, and/or energy consumption. Some preferred embodiments will now be described in detail with reference to the drawing figures, in which like reference numbers refer to like parts throughout.

Referring first to FIG. 1, an air cooled condenser system 10 is provided. The system comprises a vertical hollow tubular shell 12. The tower shell 12 may be hyperbolic or may have straight or inclined sides, and may be manufactured from re-enforced concrete, steel or other suitable construction materials. The shell has an open top region 14, as well as a base inlet region 16. The base inlet region 16 is spaced vertically above the terrain or ground level.

Surrounding the periphery of the inlet region 16 is a condenser ring 18. The condenser ring 18 includes an essentially horizontal roof 20, and under the roof 20 is provided an array of two-pass condenser bundles 22. The condenser bundles 22 are also referred to herein as tube bundles, or tube panels. The tube panels 22 are vertically arranged outside the circumference of the tower shell 12 at ground level in a ring structure. The panels 22 are angled relative to each other to form a plurality of triangular deltas when viewed in plan view. The configuration can also be thought of as a zigzag or pleated type configuration. The provision of the triangular delta layout provides a benefit of increasing the face area that is provided for a given circumference, compared to simply arranging the panels in a proximately circular arrangement. Depending on the size of the cooling tower the panels 22 may consist of more than one tube bundle.

Although a single generally circular ring of delta-angled panels 22 is shown, in some embodiments there may be more than one concentric ring located at the base of the shell 12 under the roof 20. In large units with high cooling tower shells, the exchanger deltas may be arranged in more than one bundle ring on top of each other. One tower may serve more than one steam turbine, or vice versa.

Also shown in FIG. 1, in some optional embodiments of the apparatus, a wet cooling section 50 may be disposed at the interior of the shell 12 so that after air passes through the tube panels 22, it also passes through the wet cooling section 50. In addition, although one ring of tube panels 22 is illustrated in FIG. 1, in other embodiments multiple rings of panels 22 may be stacked upon each other at the base of the shell 12.

It will be appreciated that as air enters the tube bundles, as indicated by the arrow A in FIG. 1, it will pass through the bundles thereby condensing the steam, and the air itself will become warmed as it passes under the roof 20 and enters the interior of the shell 12. Thus, the warmed air will tend to rise and therefore will exhaust the shell upper end opening 14 via the arrow labeled B. This can be referred to as a natural draft phenomenon. Due to the natural draft, it is possible to omit the need for fans and their associated complexity and power consumption. To control the amount of air flow, louvers (not shown) are eventually provided on some or all of the bundles 22.

It is desirable in some instances to locate the tube bundles 22 as low as possible in the overall installation to maximize the draft height for natural draft for a given tower height. Further, the relatively large number of panels 22 compared to the circumference of the tower base allows the provision of relatively small steam feeder headers, at the top of each of the bundles, using relatively small manifolds, which reduces expansion on the entire manifold and header system, thus reducing the need to install expansion joints.

Turning to FIG. 2, the flow arrangement through an example of a single tube bundle 22 is illustrated. In particular, a turbine 30 provides a steam feed duct 32 to a primary cooling condenser section 34. Steam is primarily condensed by air passing through the panel 22. Steam flow through the primary section 34 is shown by the arrows labeled 36. The partially condensed steam then enters a secondary condenser structure 40. There, the condensation process is completed so that a condensate 42 is extracted from the bundle bottom header 46, and any non-condensables 44 are also extracted from the secondary condenser 40 top header 45. By virtue of this arrangement, both "primary" and "secondary" condenser functions are provided, which enhances efficiency, and further an overall tube bundle structure 22 is provided which imparts heat to the ambient air making it more buoyant. Additionally the shell 12 provides a natural draft due to the density and pressure head difference between the ambient air surrounding the shell 12 and the heated air after passing through condenser ring 18 occupying the space inside shell 12, thereby avoiding the energy costs and other disadvantages that can be associated with fans. The operation of the primary and secondary condenser components associated with each of the panels 22 will now be described in more detail.

To overcome the effect of uneven cooling air flow rates each exchanger bundle 22, as discussed above, comprises a primary pass 34 and a secondary pass 40. This has the effect that all tubes within a bundle will face approximately the same air speed because the width of individual bundles with a range of maximum 2-3 m is very small compared to the tower dimensions. Therefore, air flow or cooling temperature variations on a larger scale will not affect the local inert gas extraction. Performance parameters, such as ambient temperature and air velocity, are the same for both primary and secondary condenser pass, so that the steam extraction capacity of the secondary is maintained on a local base. This reduces or eliminates possible stagnation zones in the primary pass.

Variations of air side operating parameters around the tower result in variations of exit pressure of the secondary bundles, from which the non-condensables are extracted. To enable all secondary bundle exit headers to be evacuated in parallel, e.g., the evacuation piping may be fitted with flow restriction elements (passive means) to keep non-condensable plus remaining steam velocity variations low. Another option is to provide a number of temperature controlled automatic valves (active means) in the evacuation piping which are closed when steam is flowing through the pipe. Thus local air pockets will not arise and block the heat exchange surface. When the extraction temperature is reduced the valves open again. As a further alternative, these valves may also be directly controlled by temperature gauges. In extreme wind conditions, more than one evacuation system may be the best solution.

To avoid steam side maldistribution and development of stagnation zones typical for multi-row fin tube systems, the bundles are designed preferably with single row tubes. This has the consequence that the secondary part may be designed smaller than in multi-row arrangements. This leads to augmentation of total cooling performance because secondary condensers are characterized by poorer performance than primary condensers. However, as an alternative, properly row wise performance adjusted multi-row systems may be used.

To control the air flow rate the cooling deltas are equipped with louvers. As an alternative, the louvers per delta may be divided into two (or more) separate controllable parts covering upper and lower range of the delta face area. If performance reduction is needed, part of the louvers, e.g., 50%, may be closed leaving the remaining primary and secondary percentage operative. Thus, still the full evacuation performance of the secondary pass is maintained. The area blocked by louvers is kept warm by non-condensed steam.

For extreme cold conditions at least some bundles may be designed as pure reflux systems with steam entering only from the bottom. Only these bundles will be operated in extremely cold conditions and low steam load while all two pass bundles are de-activated by louvers or alternatively, on the steam side by means of steam valves.

The main ducts from the turbine exhaust are preferably arranged on the ground. This reduces the cost of ducting support. The risers conveying steam to the individual tube bundles require only a small diameter and will exert only small forces due to temperature variations. Therefore, no expansion joints are needed.

The center area of the tower is normally free from structures, depending on the preferred duct arrangement. So a flue gas stack may be fitted within the tower shell if required.

Alternatively, with a shell center free from structures, a parallel wet cooling system 50 may be arranged internally for peak heat load applications. The wet cooling system will reject the heat coming from either a parallel turbine exhaust surface condenser or a second unit. Alternatively, part of the tower circumference may be used as cross-flow wet cooler and the remaining part as dry condenser, as described above. The size of wet and dry sections may be designed for plume abatement.

In a further embodiment of the invention, the air inlet is fitted with a water spray system to reduce the effective cooling temperature at hot summer conditions.

In a further embodiment of the invention, air guiding walls may be fitted internally and externally to reduce the effect of uneven air flow. Especially the crossing of strong wind through the tower base from one side to the other may be stopped by blocking or guiding structures within the tower shell.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. An air cooled condenser apparatus, comprising:
    a tubular shell having a circumference and an open upper end and an open lower end to create a natural draught for cooling air flow;
    a ring of cooling panel pairs disposed generally vertically with the panels in each pair at an angle to each other and disposed at the lower end of the shell, with each of the panels comprising single row tube bundles with a primary condenser region and a secondary condenser region, and adapted for air flow therethrough to condense steam in the panels;
    a duct disposed on the ground level of the shell to supply steam to the tube bundles;
    air flow controlling devices to adapt to different operating conditions; and
    a non-condensable extraction system that controls the local rate of the evacuated mixture of non-condensables and attached steam.

2. The apparatus of claim 1, further comprising a wet cooling system disposed at an interior of the shell.

3. The apparatus of claim 1, further comprising a wet cooling system disposed at part of the shell circumference.

4. The apparatus of claim 1, further comprising a flue gas stack located at an interior of the shell.

5. The apparatus of claim 1, wherein the ring of cooling panel pairs comprises two or more rings of panels stacked on top of each other.

6. The apparatus of claim 1, wherein the primary condenser region has a larger air flow surface area than the secondary condenser region.

7. The apparatus of claim 1, wherein part or all of the tube bundles comprises a secondary reflux condenser.

8. The apparatus of claim 1, further comprising louvers to selectively block some air flow through the panels.

9. An air cooled condenser apparatus, comprising:
    a tubular shell having a circumference and an open upper end and an open lower end to create a natural draught for cooling air flow
    a ring of cooling panel pairs disposed generally vertically with the panels in each pair at an angle to each other and disposed at the lower end of the shell, with each of the panels comprising a primary condensing means and a secondary condensing means, and adapted for air flow therethrough to condense fluid in the panels;
    tube bundles with more than one tube row where each row is related to either the primary or the secondary condenser means with the secondary means facing the cooling air;
    air directing means configured so that air flows through the panels; and
    a non-condensable extraction system with active or passive devices to control the local rate of the evacuated mixture of non-condensables and attached steam.

10. The apparatus of claim 9, further comprising a wet cooling system disposed at an interior of the tower shell.

11. The apparatus of claim 9, further comprising a wet cooling system disposed at part of the shell circumference.

12. The apparatus of claim 9, further comprising a flue gas stack located at an interior of the tower shell.

13. The apparatus of claim 9, wherein the ring of cooling panels comprises two rings of panels stacked on top of each other.

14. The apparatus of claim 9, wherein the primary condensing means has a larger air flow surface area than the secondary condensing means.

15. The apparatus of claim 9, further comprising air flow blocking means to selectively block some air flow through the panels.

16. An air cooled condenser apparatus, comprising:
    a tubular shell having an open upper end and an open lower end;
    a ring of hybrid cooling panels disposed generally vertically in delta pairs next to each other, with each of the hybrid panels comprising a primary condenser region and a secondary condenser region, and adapted for air flow therethrough to condense fluid in the panels, wherein the ring is disposed at the lower end of the shell and configured so that air flow through the panels passes through and exits the open upper end of the shell; and
    a wet cooling system disposed at an interior of the shell.

* * * * *